April 26, 1938.　　　　R. S. HINSEY　　　　2,115,106
APPARATUS FOR SUPPORTING GLASS SHEETS
Filed March 20, 1936　　　2 Sheets-Sheet 1
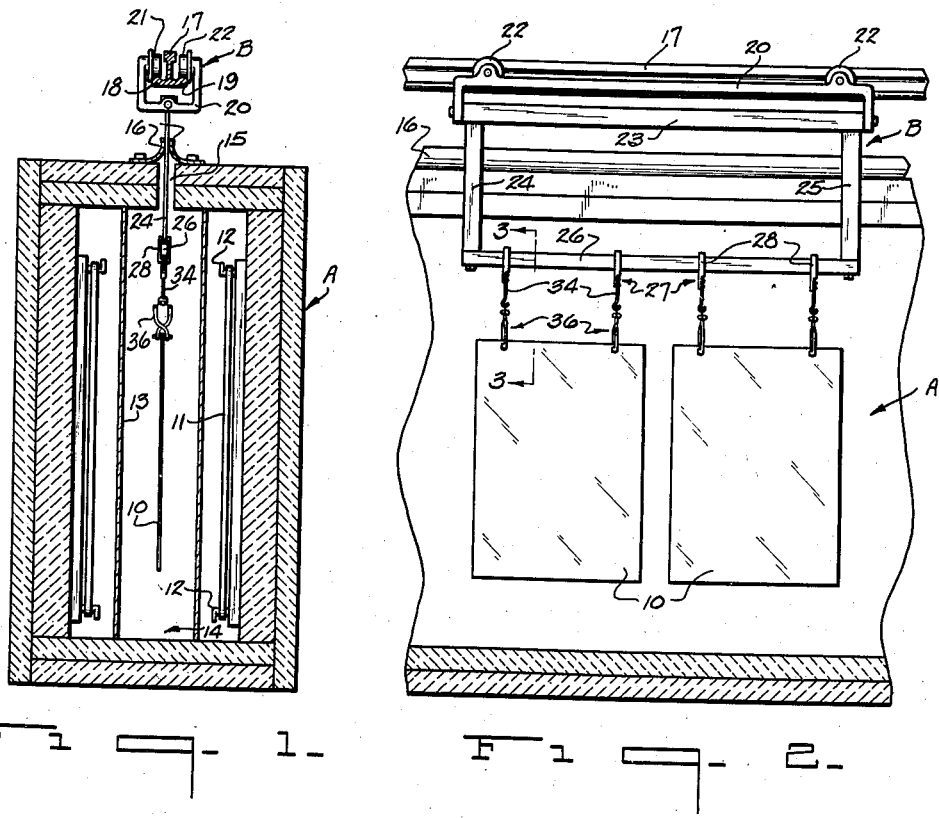
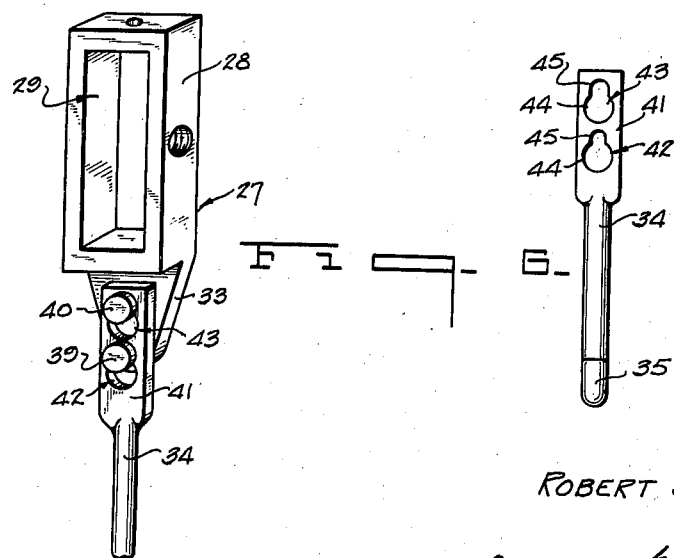
Inventor
ROBERT S. HINSEY.
By Frank Fraser
Attorney

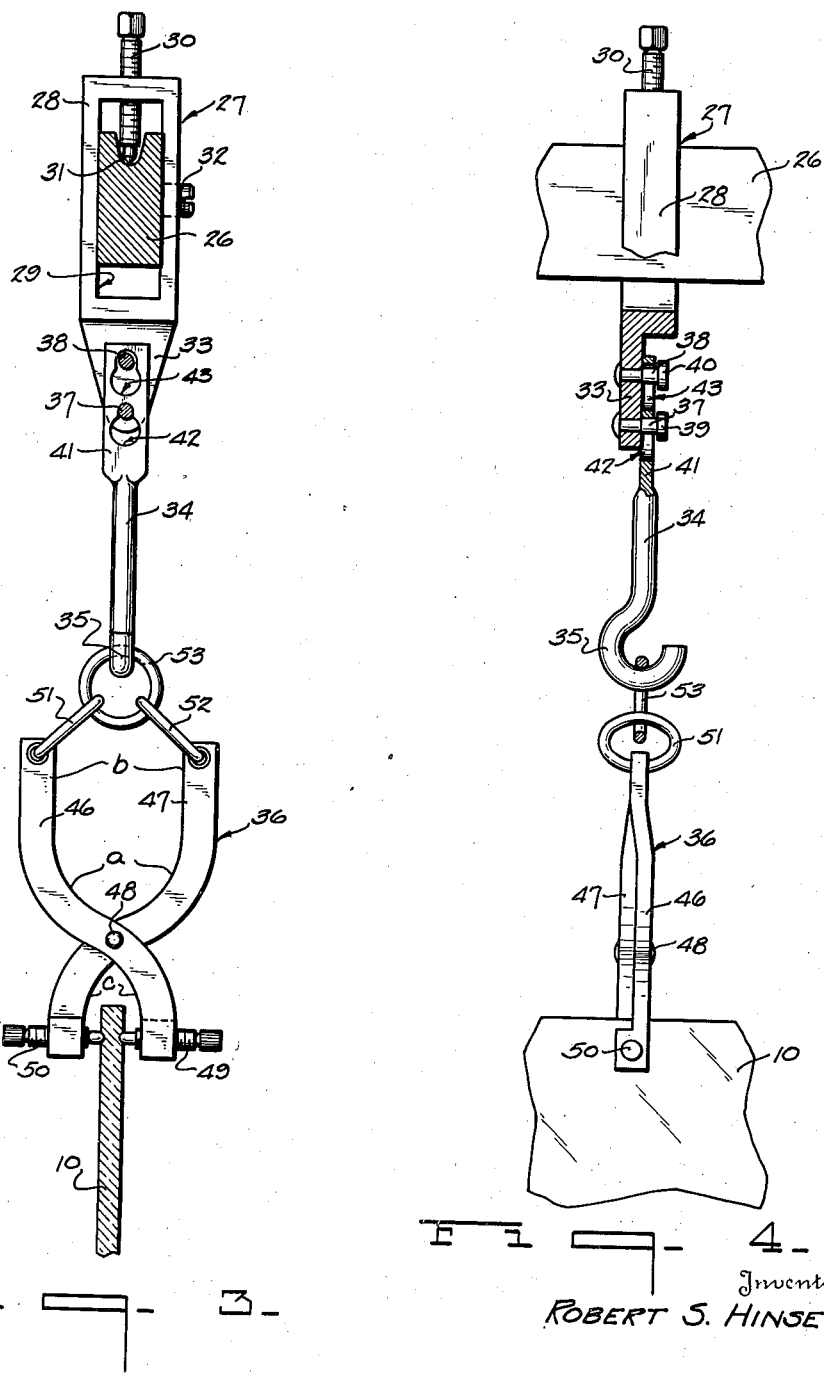

Patented Apr. 26, 1938

2,115,106

UNITED STATES PATENT OFFICE 2,115,106

APPARATUS FOR SUPPORTING GLASS SHEETS

Robert S. Hinsey, Toledo, Ohio, assignor to Libbey-Owens-Ford Glass Company, Toledo, Ohio, a corporation of Ohio Application March 20, 1936, Serial No. 69,756

9 Claims. (Cl. 49—14)

The present invention relates broadly to apparatus for tempering glass sheets and more particularly to the means for supporting the same during the treatment thereof.

In the present practice of tempering glass sheets, the said sheets are first heated to approximately the point of softening of the glass and then quickly cooled by directing blasts of air against opposite surfaces thereof simultaneously. In the tempering of glass sheets in this manner, the sheet must be supported so that it is free to expand and contract in its own plane and to this end it has been customary to suspend the sheet from a plurality of relatively small hooks or tongs which engage opposite faces of the said sheet near its upper edge. These hooks or tongs are ordinarily carried by a horizontal supporting bar and due to the extremes of temperature to which the bar is exposed, there is a tendency for it to become twisted during the heating of the glass, thereby throwing the hooks or tongs out of horizontal alignment with one another resulting in the glass sheet becoming warped or distorted.

An object of this invention is the provision of improved supporting means for the tongs which will assure that the said tongs or points of support for the glass sheet will always be maintained in horizontal alignment with one another, thereby overcoming the difficulty as to lateral distortion or deformation of the said sheet.

Another object of the invention is the provision of self-aligning supporting means to which the tongs are attached and which means acts automatically, upon twisting of the tong support bar, to maintain the tongs in horizontal alignment with one another.

Other objects and advantages of the invention will become more apparent during the course of the following description when taken in connection with the accompanying drawings.

In the drawings wherein like numerals are employed to designate like parts throughout the same, Fig. 1 is a vertical transverse sectional view through a heating furnace showing the improved sheet supporting means provided by the invention associated therewith;

Fig. 2 is a vertical longitudinal sectional view through the furnace showing the sheet supporting means in side elevation;

Fig. 3 is a vertical sectional view taken substantially on line 3—3 of Fig. 2 showing one of the tongs and the supporting means therefor;

Fig. 4 is a view taken at substantially right angles to Fig. 3, partially in section;

Fig. 5 is a perspective view of one of the tong supporting units; and

Fig. 6 is a view of one of the hangers.

With reference to the drawings, the letter A designates in its entirety one type of furnace which may be used for heating the glass sheets to the desired temperature while the letter B designates generally the improved means herein provided for supporting the glass sheets 10 to be tempered within said furnace.

Although the particular construction of the furnace A constitutes no part of the present invention, it is preferably of the electrically heated type, being provided at opposite sides thereof with electrical heating elements 11 carried by insulators 12 and which are adapted to be connected to any suitable controlling and indicating devices so that the temperature of the furnace can be accurately regulated. Baffle walls 13 may also be used, and it will be seen that they cooperate with the top and bottom walls of the furnace to form a compartment 14 within which the glass sheets are received. The furnace is provided with a slot 15 in the top thereof normally closed by strips 16 of asbestos or the like.

The glass sheet 10 to be tempered is suspended from the supporting means B outside the furnace and is then moved along through the furnace which is in the form of a tunnel kiln of gradually increasing temperature. When the glass sheet has reached a proper temperature for chilling, it is removed through the outlet end of the furnace and subjected immediately to the action of suitable cooling means not shown but which operation is well known in the art.

The supporting means B is mounted for movement along a monorail 17 extending longitudinally above the slot 15 in the top of the furnace and being provided with the oppositely directed horizontal flanges 18 and 19. The supporting means comprises a carriage or trolley 20 having at each end wheels 21 and 22 which ride on the flanges 18 and 19 of the rail 17. Secured to the carriage is a longitudinally extending horizontal bar 23 from the opposite ends of which depend the vertical parallel bars 24 and 25 connected together at their lower ends by a horizontal tong support bar 26 to form a rigid frame.

Mounted upon the tong support bar 26 are a plurality of tong supporting units 27, each comprising a substantially rectangular loop or collar 28 encircling said bar and having an opening 29 through which the bar is received. The width of the opening 29 in the collar 28 is substantially the same as the thickness of the bar 26 while the height of said opening is somewhat greater than the width of said bar, thereby permitting the collar to be moved vertically relative thereto. This vertical adjustment is effected by a screw 30 threaded through the top of the collar and received within a longitudinally extending, substantially V-shaped groove 31 formed in the top of the tong support bar 26. The collar 28 may be slid longitudinally along the bar 27 to the desired position and secured in such position by a set screw 32.

The collar 28 is provided at the bottom thereof with a depending ear 33 from which is hung a vertical hanger or strap 34 formed at its lower end with a hook 35 carrying the tong 36. The ear 33, formed on collar 28, is provided with two vertically aligned horizontal pins 37 and 38 having enlarged cylindrical heads 39 and 40 respectively at their outer ends. The hanger 34 is carried by the pins 37 and 38 and to this end the upper end portion of the hanger is flattened as at 41 and provided with the vertically aligned inverted key-hole slots 42 and 43, each comprising a relatively large cylindrical opening 44 and a reduced slotted portion 45 leading upwardly therefrom. The openings 44 of the key-hole slots 42 and 43 are of such size that the hanger can be slipped over the heads 39 and 40 of the pins 37 and 38, after which the said hanger is lowered so that the pins will be received within the reduced slotted portions 45.

The pin 37 is of such diameter that it snugly fits the reduced slotted portion 44 of the key-hole slot 42 while the reduced slotted portion of the key-hole 44 is slightly larger than the pin 38 as clearly shown in Fig. 3. With this construction, it will be readily apparent that the hanger 34 is free to pivot upon the lower pin 37 and that it is limited in its pivotal movement by the upper pin 38, the degree of swinging movement of the hanger being determined by the amount of clearance between the pin 38 and the walls of the slotted portion 45 of key-hole slot 43. The heads 39 and 40 on the pins 37 and 38 of course serve to prevent accidental displacement of the hanger.

The type of tong 36 herein provided comprises a pair of substantially vertical or upstanding complemental tong members or levers 46 and 47 pivotally connected in overlapping relation intermediate their ends as at 48. The tong members 46 and 47 are bent as at $a$ and cross one another at substantially right angles so that opposite ends thereof may be swung simultaneously toward and away from one another. The upper ends $b$ of the tong members constitute handle portions while the lower ends $c$ constitute jaw portions.

The jaw portions $c$ of the tong members carry at their lower ends the work gripping elements 49 and 50 comprising screws threaded horizontally through the tong members and having smooth rounded inner ends which engage opposite faces of the glass sheet 10.

Carried at the upper ends of handle portions $b$ of tong members 46 and 47 are rings 51 and 52 respectively through which is looped a third ring 53 which is hung from the hook 35 formed at the lower end of the hanger 34. The rings 51 and 52 constitute in effect toggle links which are responsive to upward movement of the ring 53 relative to the tong members to swing the handle portions $b$ together to close the jaw portions $c$.

In practice, one or a plurality of glass sheets 10 are first hung from the tongs 36, the pins 49 and 50 of which engage the said sheets near their upper edges, after which the carriage 20 is rolled along the rail 17 to move the said sheets into the furnace where they are heated to a temperature corresponding approximately to the point of softening of the glass. When the glass sheets have been properly heated, the carriage 20 is again moved along the rail 17 to withdraw the said sheets from the furnace and bring them into proper relation with respect to the cooling means. The cooling means has not been illustrated as it constitutes no part of the present invention, it being sufficient to state that any type of cooling means capable of rapidly acting upon the glass in a manner to place the outer surfaces of the sheets under compression and the interiors thereof under tension may be used. When the glass sheets are moved into the furnace, the vertical bars 24 and 25 of the supporting means project through the slot 15 in the top of the furnace and since the closure members 16 are flexible, they in no way interfere with the movement of the carriage 20 along rail 17.

With the above type of tong supporting means, it will be readily apparent that the several tongs 36 can be adjusted vertically independently of one another and relative to the supporting bar 26 by simply loosening the set screws 32 and properly adjusting screws 30. Also, that the tongs can be moved longitudinally along the bar 26 to take care of different sized sheets.

Another important advantage of this type of tong support is that it embodies means for automatically maintaining the tongs in alignment with one another upon twisting of the tong support bar 26. This is due to the novel manner in which the hanger 34 is associated with the collar 28. It will of course be obvious that were the hanger 34 rigidly secured to or formed integral with the collar 28, any twist which might occur in the bar 26 would be imparted to the tong supporting unit and cause the hanger to be swung to one side into an inclined position, thereby resulting in the tong 36 carried thereby being thrown out of alignment with the other tongs. The throwing of the tongs out of alignment with one another would naturally subject the upper horizontal edges of the glass sheets to lateral distortion or deformation, especially since the sheets are heated to a temperature approximating the softening point of the glass.

According to the present invention, however, this difficulty is eliminated by pivotally associating the hanger 34 with the collar 28 in the manner above described so that any twisting of the bar 26 will not be imparted to the hanger. On the other hand, the hanger will always be maintained in a vertical position due to the weight of the tongs and the glass. Thus, in the event the tong support bar 26 should become twisted due to the intense heat to which it is subjected in the furnace, the pivotal mounting of the hanger 34 on pin 37 will permit the said hanger to remain in a vertical position so that the tong carried thereby will not be thrown out of alignment with the other tongs. The maintaining of the tongs in alignment with one another prevents any lateral deformation of the upper horizontal edges of the glass sheets.

It will also be seen that with this construction, the hangers 34 may be quickly and easily attached to or detached from the pins 37 and 38. This is of advantage since it is sometimes desirable to use hangers of different lengths and with the construction provided, the hangers may be readily changed without disturbing the position of the collars or removing the supporting units from the tong support bar.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. Apparatus for use in the tempering of glass sheets comprising a longitudinally extending supporting bar, a tong supporting unit including a supporting member mounted upon said bar, a vertical hanger pivoted to said supporting member, means carried by said supporting member and engageable by the hanger for limiting the pivotal movement of said hanger, and a tong carried by said hanger and having work gripping portions adapted to engage the glass sheet.

2. Apparatus for use in the tempering of glass sheets comprising a longitudinally extending supporting bar, a tong supporting unit including a supporting member mounted upon said bar, a vertical hanger pivoted to said supporting member, means carried by said supporting member and engageable by the hanger for limiting the pivotal movement of said hanger, a tong carried by said hanger and having work gripping portions adapted to engage the glass sheet, and means for moving the tong supporting unit vertically relative to the supporting bar to effect raising or lowering of said tong.

3. Apparatus for use in the tempering of glass sheet comprising a longitudinally extending supporting bar, a tong supporting unit including a collar mounted upon said bar, a vertical hanger pivotally connected adjacent its upper end to said collar, means carried by said collar and engageable by the hanger for limiting the pivotal movement of said hanger, and a tong carried at the lower end of the hanger and having work gripping portions adapted to engage the glass sheet.

4. Apparatus for use in the tempering of glass sheet comprising a longitudinally extending supporting bar, a tong supporting unit including a collar mounted upon said bar, a vertical hanger pivotally mounted adjacent its upper end to said collar for swinging movement, a pin element carried by the collar and engageable by the hanger for limiting the swinging movement of said hanger, and a tong carried at the lower end of the hanger and having work gripping portions adapted to engage the glass sheet.

5. Apparatus for use in the tempering of glass sheets comprising a longitudinally extending supporting bar, a tong supporting unit including a collar mounted upon said bar and provided with a pair of vertically aligned horizontal pins, a hanger depending from said collar and provided with a pair of vertically aligned openings for receiving said pins therethrough, said hanger being free to pivot upon the lower pin and limited in its pivotal movement by the upper pin, and a tong carried at the lower end of said hanger and having work gripping portions adapted to engage the glass sheet.

6. Apparatus for use in the tempering of glass sheets comprising a longitudinally extending supporting bar, a tong supporting unit including a collar mounted upon said bar and provided with a pair of vertically aligned horizontal pins, a hanger depending from said collar and provided with a pair of vertically aligned openings for receiving said pins therethrough, said hanger being free to pivot upon the lower pin and limited in its pivotal movement by the upper pin, a tong carried at the lower end of said hanger and having work gripping portions adapted to engage the glass sheet, and means for moving the said collar vertically relative to the supporting bar to effect raising or lowering of said tong.

7. Apparatus for use in the tempering of glass sheets comprising a longitudinally extending supporting bar, a tong supporting unit including a collar mounted upon said bar and provided with a pair of vertically aligned horizontal pins, a hanger depending from said collar and provided with a pair of vertically aligned openings for receiving said pins therethrough, the lower pin snugly fitting the lower opening in the hanger while the upper pin has a loose fit with the upper opening whereby the said hanger is free to pivot on the lower pin and limited in its pivotal movement by the upper pin, and a tong carried at the lower end of said hanger and having work gripping portions adapted to engage the glass sheet.

8. Apparatus for use in the tempering of glass sheets comprising a longitudinally extending supporting bar, a tong supporting unit including a collar mounted upon said bar and provided with a pair of vertically aligned horizontal pins, a hanger depending from said collar and provided with a pair of vertically aligned openings for receiving said pins therethrough, the lower pin snugly fitting the lower opening in the hanger while the upper pin has a loose fit with the upper opening whereby the said hanger is free to pivot on the lower pin and limited in its pivotal movement by the upper pin, a tong carried at the lower end of said hanger and having work gripping portions adapted to engage the glass sheet, and means carried by the said collar and engaging the supporting bar for moving the former relative to the latter to effect raising or lowering of said tong.

9. Apparatus for use in the tempering of glass sheets comprising a longitudinally extending supporting bar, a tong supporting unit including a collar mounted upon said bar and provided with a pair of vertically aligned horizontal pins having enlarged heads at their outer ends, a hanger depending from said collar and provided with a pair of vertically aligned, inverted key-hole slots, each comprising a relatively large opening and a reduced slotted portion leading therefrom, the openings of the key-hole slots being adapted to receive the heads on the pins therethrough, with the said pins being received within the reduced slotted portions, the lower pin snugly fitting the reduced slotted portion of the bottom key-hole slot while the upper pin fits loosely within the reduced slotted portion of the top key-hole slot whereby the said hanger is free to pivot upon the lower pin and limited in its pivotal movement by the upper pin, and a tong carried at the lower end of said hanger and having work gripping portions adapted to engage the glass sheet.

ROBERT S. HINSEY.